H. J. SAUER.
LAMP BRACKET.
APPLICATION FILED JUNE 8, 1915.
1,158,078.
Patented Oct. 26, 1915.
2 SHEETS—SHEET 1.
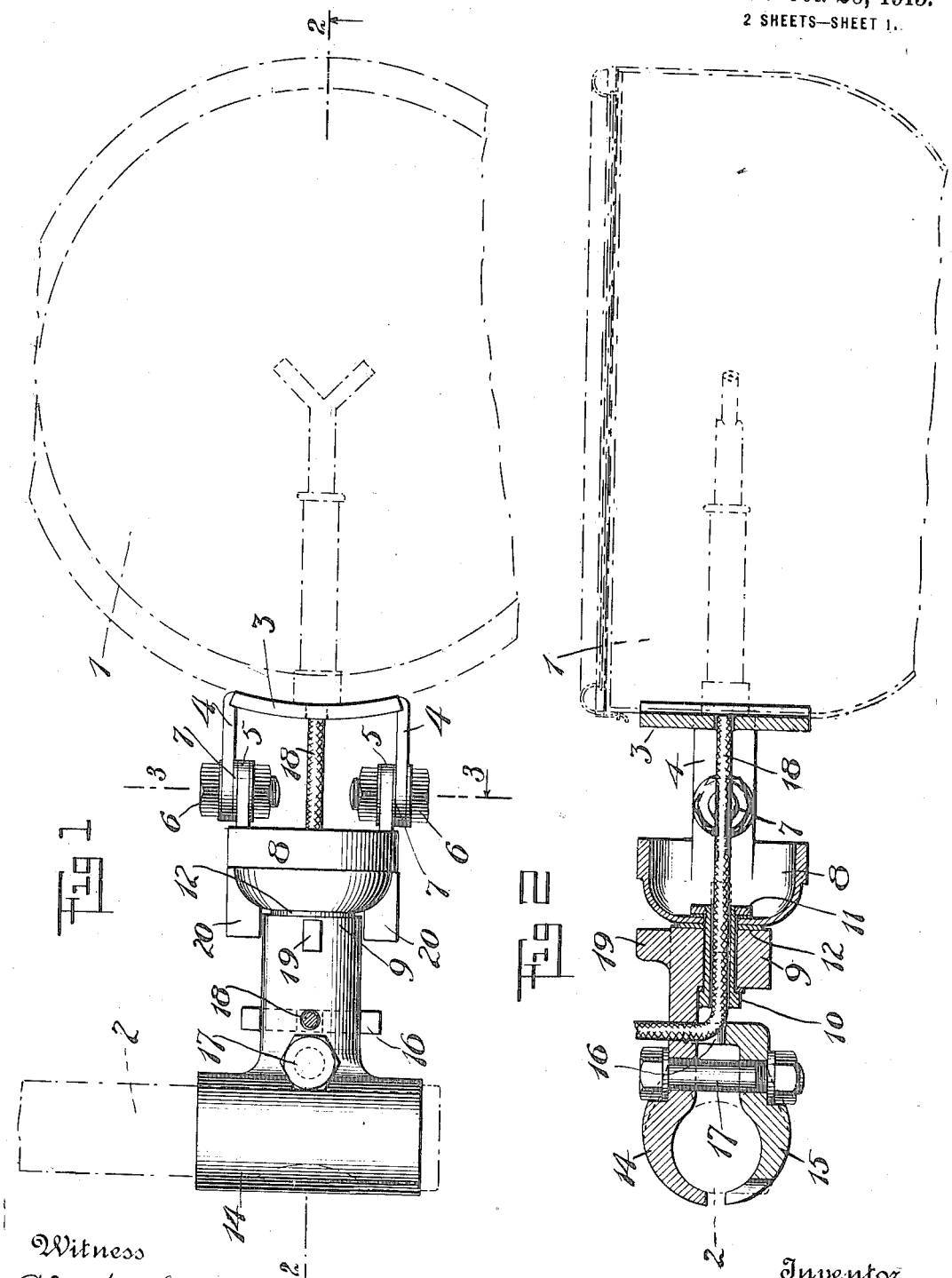
Witness
C. J. Hachenberg.
Inventor
Henry J. Sauer
By his Attorneys
Mitchell & Allen H. J. SAUER.
LAMP BRACKET.
APPLICATION FILED JUNE 8, 1915.
1,158,078.
Patented Oct. 26, 1915.
2 SHEETS—SHEET 2.
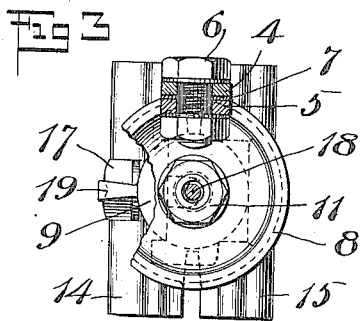
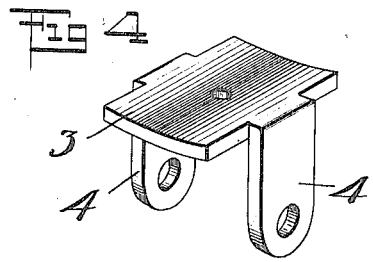
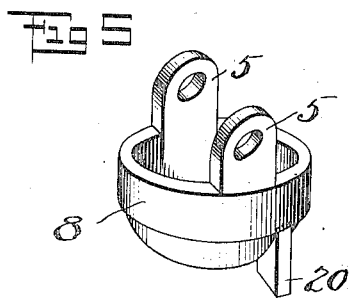
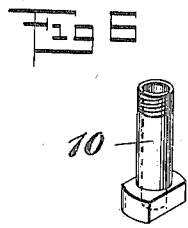
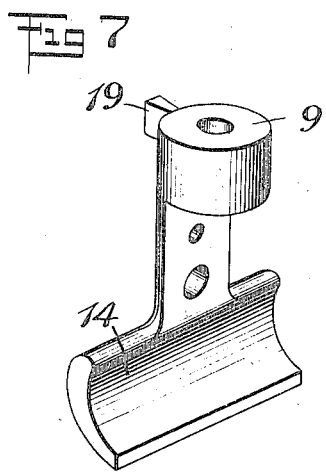
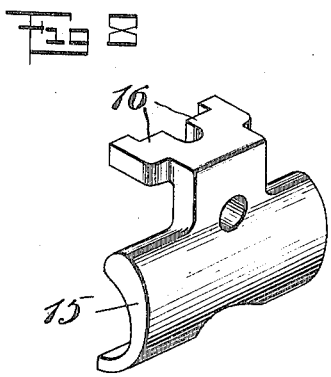
Witness
C. J. Hachenberg
Inventor
Henry J. Sauer,
By his Attorneys
Mitchell & Alleger

UNITED STATES PATENT OFFICE.

HENRY J. SAUER, OF FAIRFIELD, CONNECTICUT.

LAMP-BRACKET.

1,158,078.  Specification of Letters Patent.  Patented Oct. 26, 1915.

Application filed June 8, 1915. Serial No. 32,812.

*To all whom it may concern:*

Be it known that I, HENRY J. SAUER, a citizen of the United States of America, residing at Fairfield, Fairfield county, State of Connecticut, have invented a new and useful Lamp-Bracket, of which the following is a specification.

My invention relates to a new and useful automobile lamp bracket, the object being to provide simple and effective means for permitting user to secure the lamp in place and to adjust it in any desired angle from the seat. The construction is such that the bracket may be fastened on to one side of the wind shield where it can be easily reached by the driver so that the rays of light may be directed at will vertically or laterally.

In the drawings: Figure 1 is a side elevation of the bracket showing a part of a wind shield and the headlight or lamp in dotted outline. Fig. 2 is a section on the line 2—2. Fig. 3 is a section on the line 3—3 showing certain parts in elevation and partly broken away. Figs. 4-8 inclusive are perspective views of details.

1 conventionally represents in dotted outline a headlight.

2 conventionally represents in dotted outline the side bar or frame of a wind shield or other suitable support.

The bracket by which the headlight is connected to the wind shield is of unique form and construction and comprises the following parts. 3 represents a saddle to which the headlight 1 may be secured in any desired way and which has a rocking movement. The saddle is provided with two spaced arms 4—4 which in turn are pivotally mounted to rock on two spaced arms 5—5. 6—6 are pivot bolts, and 7—7 are friction washers by which the arms 4—5 may be respectively held in frictional engagement so that they will remain in any adjusted position. The arms 5—5 are carried by a rotatable member 8 which has a central passage and which is preferably cupped and which is mounted to turn upon a head 9. 10 is a bolt having a central passage, the said bolt passing through a central bore in the head 9 and through a hole in the bottom of the cup 8 so that it may receive a nut 11 and a friction washer 12. The head of the bolt 10 may be slabbed off on one or both sides so that it will not turn in the bore of the head 9 when the nut 11 is being screwed up for adjustment. 14 is a fixed jaw carried by the head 9. 15 is a movable clamping jaw arranged to coöperate with the jaw 14 to grip upon the supporting member 2. The outer end of the movable jaw 15 has a shoulder or fulcrum 16. 17 is a tightening bolt which passes through the jaws 14—15 to grip the same upon the supporting member 2. 18 conventionally represents a flexible gas pipe or electric cable, the same preferably passing through a guide passage in the fixed jaw 14 and through the bolt 10 and through a hole in the saddle 3 whereby it may lead into the lamp or headlight 1.

When the bracket is mounted upon the support 2, and the several friction adjusting bolts have been set up to apply the desired degree of friction, the headlight may be adjusted so as to direct the rays of light up or down or sidewise to any desired degree within a suitable range, but in order to prevent accident to the flexible gas pipe or cable, I provide a stop to limit the turning movement of the member 8 upon the head 9. This stop is indicated at 19 and is preferably mounted upon the head 9. The back of the member 8 may have one or more stop lugs 20—20 which coact with the stop 19.

I have shown my invention in its preferred form, appreciating that changes may be made without departing from the spirit and scope thereof.

What I claim is:

In a headlight bracket, a pair of clamping jaws, a head carried by one of said jaws having a passage therethrough, a rotatable member supported at the outer end of said head, a hollow bolt uniting said parts friction-tight but permitting the rotating member to be rotated on the head to different positions of adjustment, a saddle pivotally connected on said rotating member to rock, with means for holding said saddle friction-tight in different positions of adjustment relatively to said rotating member.

HENRY J. SAUER.